United States Patent [19]

Wachsmuth et al.

[11] 3,852,199

[45] Dec. 3, 1974

[54] APPARATUS FOR SEPARATING SOLIDS FROM LIQUIDS

[75] Inventors: William A. Wachsmuth, Mississauga, Ontario; Anders Lindstol, Oakville, Ontario, both of Canada

[73] Assignee: Ecodyne Corporation, Chicago, Ill.

[22] Filed: Nov. 17, 1972

[21] Appl. No.: 307,319

[52] U.S. Cl. .............................................. 210/522
[51] Int. Cl. .............................................. B01d 21/10
[58] Field of Search ............. 210/521, 522, 83, 232; 264/167, 177 R; 156/79

[56] References Cited
UNITED STATES PATENTS

| 3,346,122 | 10/1967 | Cornelissen | 210/523 |
| 3,399,135 | 8/1968 | Conley, Jr. et al. | 210/521 |
| 3,491,892 | 1/1970 | McCann | 210/521 |
| 3,666,112 | 5/1972 | Pielkenrood et al. | 210/521 |
| 3,741,401 | 6/1973 | Hsiung | 210/521 |
| 3,768,648 | 10/1973 | Anderson et al. | 210/522 |

Primary Examiner—Charles N. Hart
Assistant Examiner—F. F. Calvetti
Attorney, Agent, or Firm—Charles M. Kaplan; Joel E. Siegel

[57] ABSTRACT

Apparatus for separating solids from liquids including a plurality of parallel tubes is made by assembling extruded members having integral ribs and attaching means for securing said ribs.

14 Claims, 17 Drawing Figures

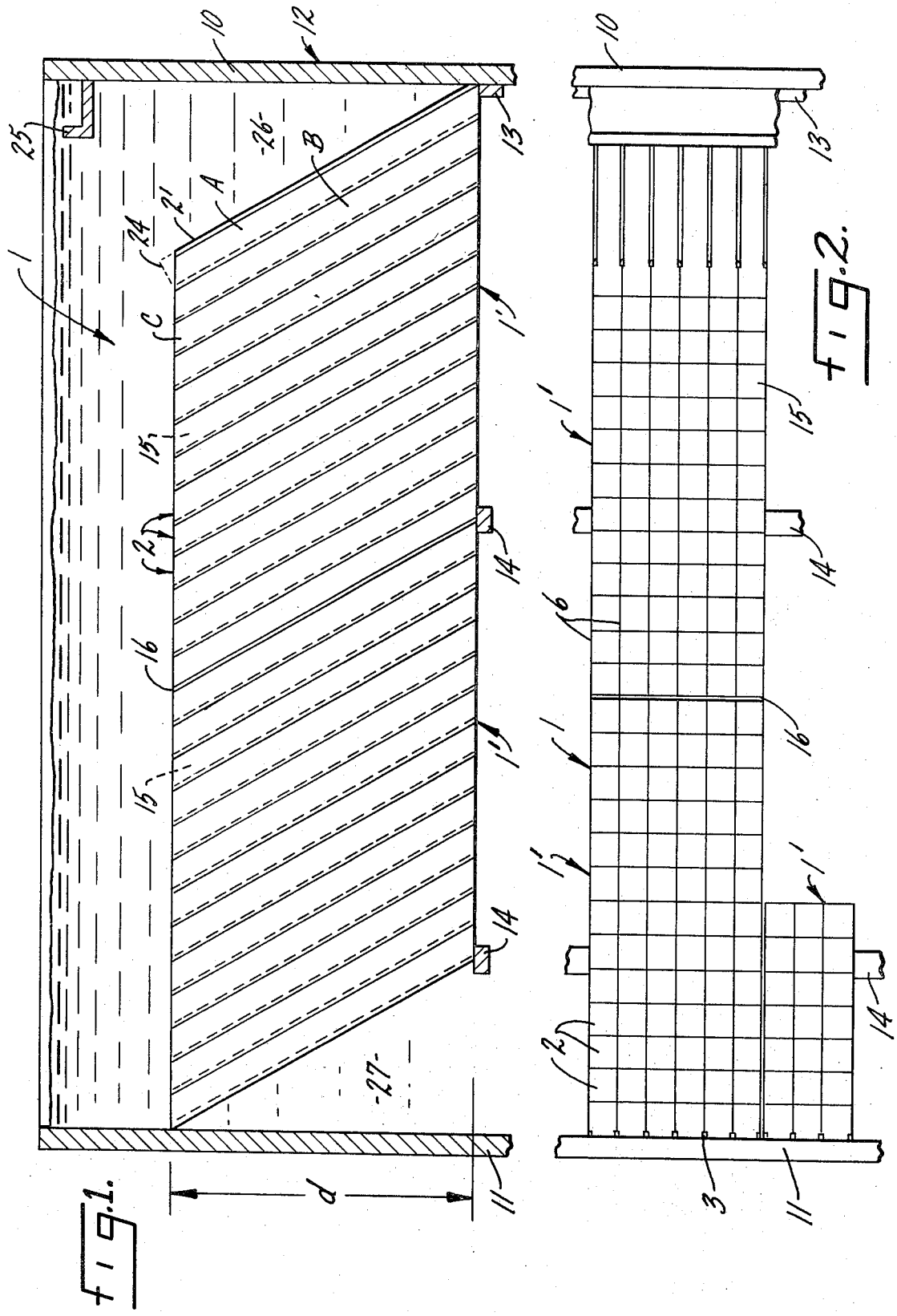

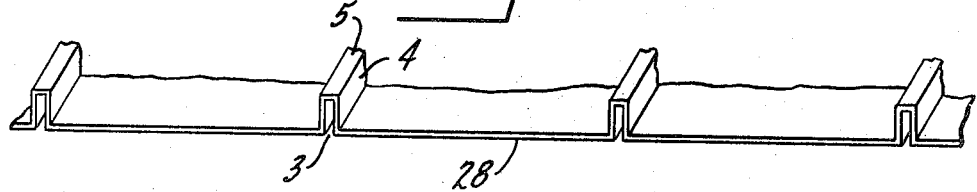
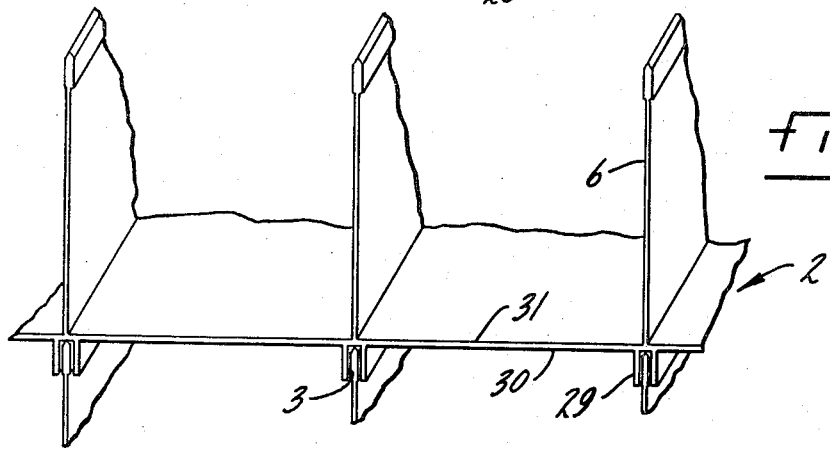
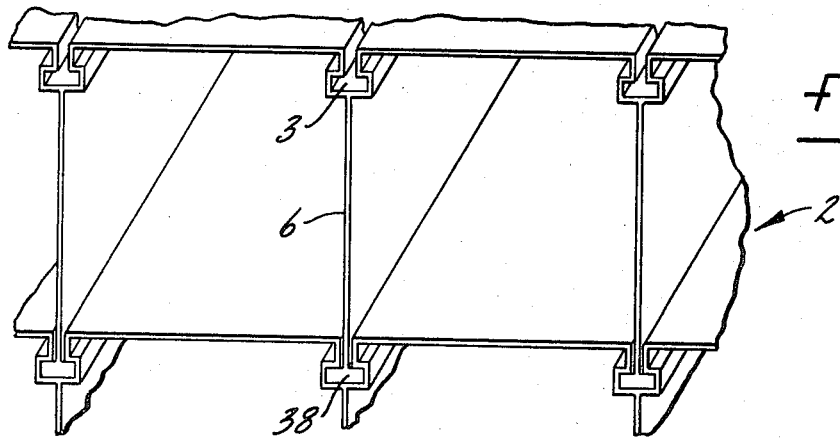
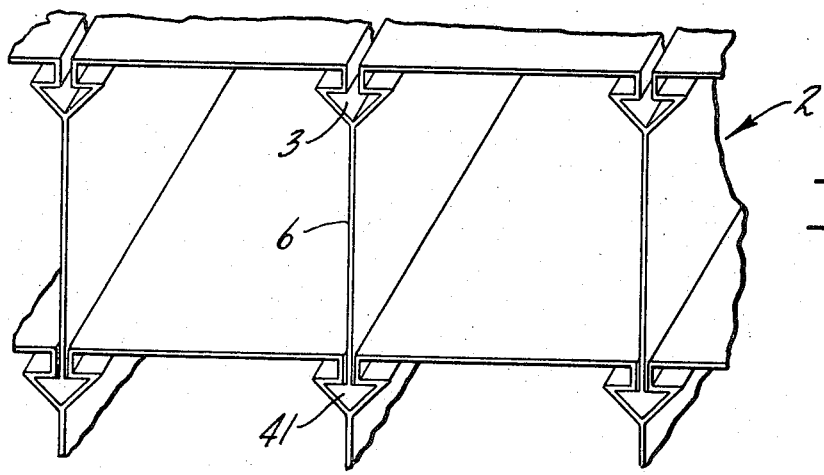

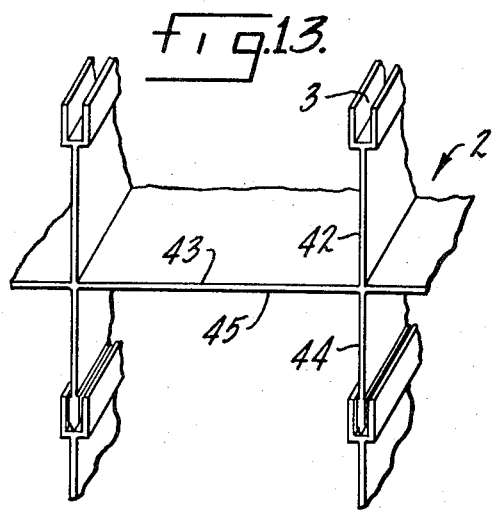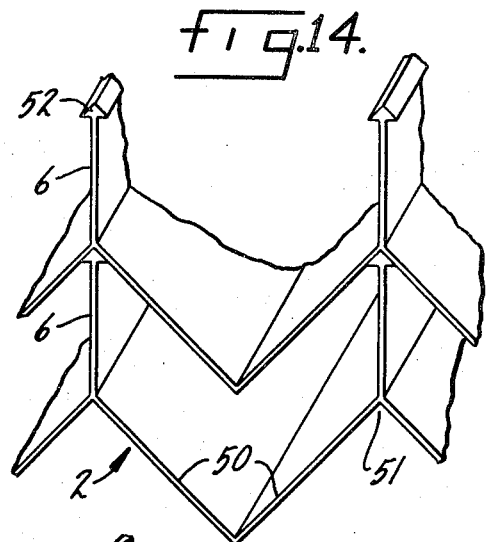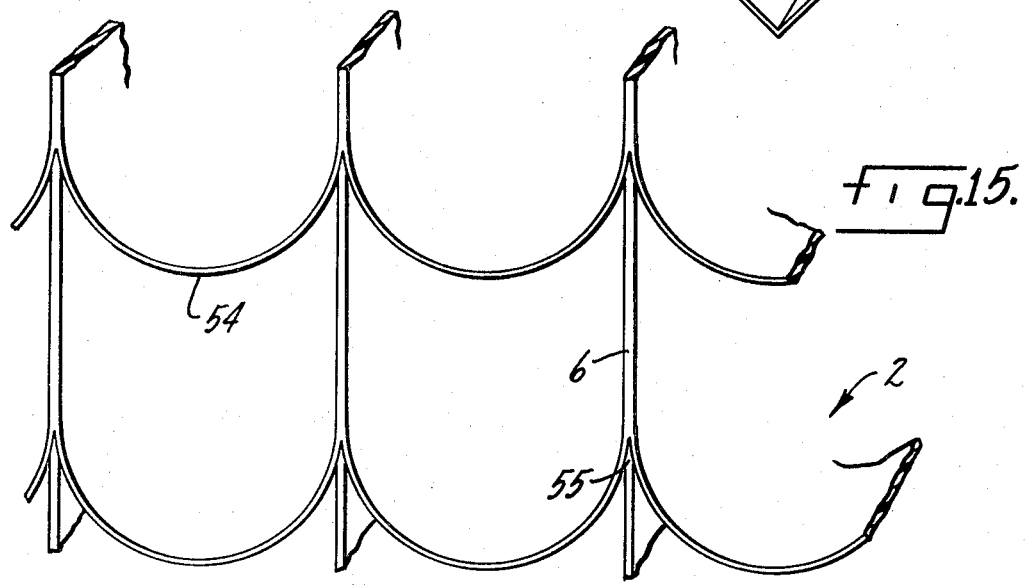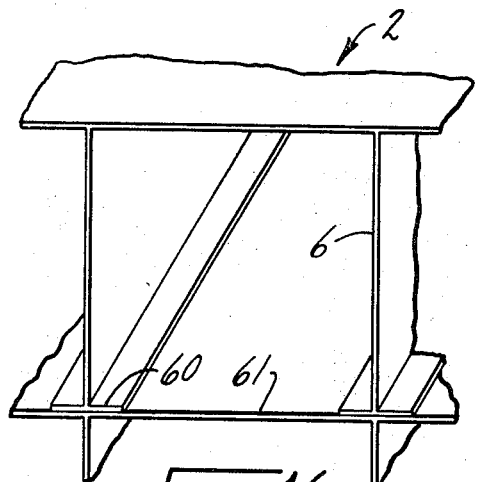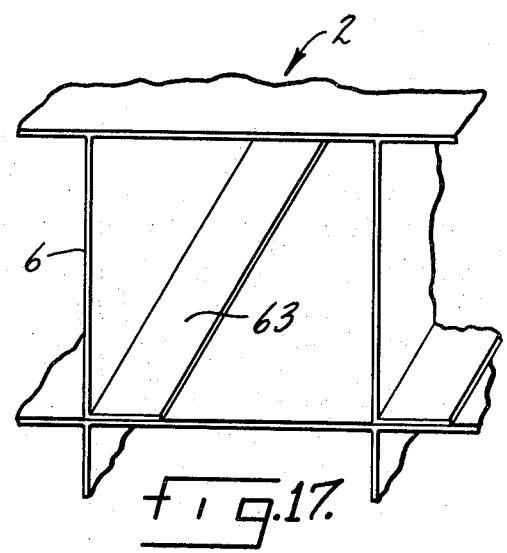

APPARATUS FOR SEPARATING SOLIDS FROM LIQUIDS

BACKGROUND OF THE INVENTION

This invention relates to liquid treatment equipment and more particularly to liquid-solid separation devices having a plurality of parallel tubes.

Parallel-tube liquid treating devices constructed according to prior art techniques have not been entirely satisfactory because they were made from numerous pieces having different sizes and shapes, or else required complicated machines or fabrication techniques to assemble the components from which they were made. Such complicated structure and fabrication techniques led to waste of material, increased cost, and defects in the completed apparatus.

SUMMARY OF THE INVENTION

Accordingly, it is an object of this invention to provide a multi-tube liquid treating device that is constructed from a minimum number of differently shaped parts.

Another object is to provide water treating equipment made from a plurality of identical pieces.

Another object is to provide liquid treatment equipment that is strong, durable, low-cost, and which does not possess defects found in corresponding prior art equipment.

Another object is to provide improved water treating equipment.

Another object is to provide multi-tube liquid treatment equipment in which separate units may be abutted without loss of capacity caused by blind tubes.

Another object is to provide multi-tube liquid treatment apparatus that causes minimum loss of effective treatment area when rectangular modules are used in round tanks.

Another object is to provide an improved method of making liquid treatment equipment.

Still other objects and advantages of the invention will be revealed in the specification and claims, and the scope of the invention will be set forth in the claims.

DESCRIPTION OF THE DRAWINGS

FIG. 1 is a partially broken-away side view of a preferred embodiment of the invention.

FIG. 2 is a top plan view of the embodiment shown in FIG. 1.

FIG. 9 is a perspective, partially broken-away view of a special end closure member.

FIG. 10 is a perspective, partially broken-away view of another embodiment of the invention.

FIG. 11 is a perspective, partially broken-away view of another embodiment of the invention.

FIG. 12 is a perspective, partially broken-away view of another embodiment of the invention.

FIG. 13 is a perspective, partially broken-away view of another embodiment of the invention.

FIG. 14 is a perspective, partially broken-away view of another embodiment of the invention.

FIG. 15 is a perspective, partially broken-away view of another embodiment of the invention.

FIG. 16 is a perspective, partially broken-away view of another embodiment of the invention.

FIG. 17 is a perspective, partially broken-away view of another embodiment of the invention.

DESCRIPTION OF PREFERRED EMBODIMENTS

FIGS. 1–5 show a multi-tube settling device 1 for separating solids from liquids made from a plurality of identical, extruded, substantially planar plastic members 2. Each member 2 has a series of spaced-apart straight, parallel, grooves or slot means 3 on one surface thereof. Slot means 3 are defined by material integral with planar members 2 which projects at 4 generally perpendicularly to the plane of members 2 and which is generally parallel at 5 to the plane of members 2.

Figure 3:
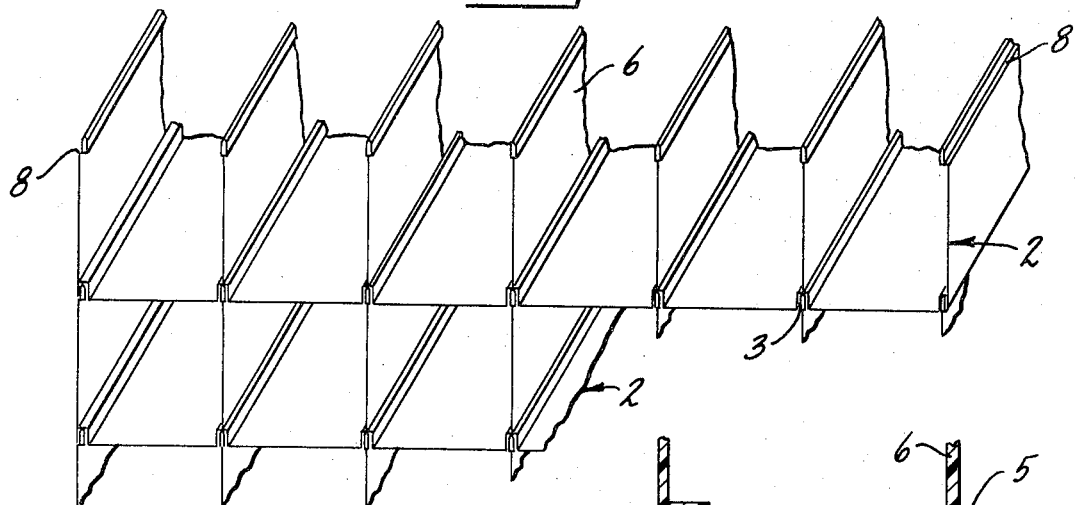
FIG. 3 is a perspective, partially broken-away enlarged view of the embodiment of FIG. 1.
Figure 6:
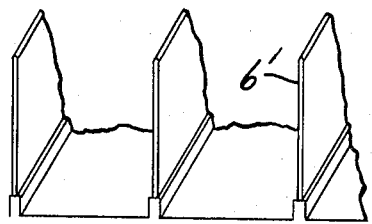
FIG. 6 is a perspective, partially broken-away view of a modification of the embodiment of FIGS. 1–3.
Figures 4, 5:
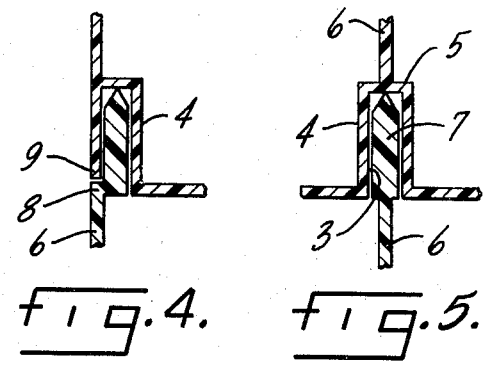
FIG. 4 is a detail view of an end connection of the embodiment of FIG. 1.
FIG. 5 is a detail view of an intermediate connection of the embodiment of FIG. 1.

Generally flat, straight, tube-defining, equally-spaced, longitudinal ribs 6 extend from the integral material 5 in a direction generally perpendicular to the opposite surface of the plane of members 2. Ribs 6 are dimensioned to be received in slot means 3, and preferably each rib has an enlarged terminal portion 7 for fitting snugly into slot means 3. Portion 7 may have a tapered or pointed tip to facilitate entry into slot means 3. The end ribs are offset slightly at 8 toward the center of member 2, and end integral projections 4 are shortened at 9 so that the exterior of device 1 does not have projections which would unnecessarily take up space by contacting adjacent identical devices 1. As shown in FIG. 6, as an alternative to enlarged portions 7, each rib 6′ may be as thick as portion 7 of FIG. 3, and thus the entire rib 6′ is thicker than the remainder of member 2. Settling device 1 is made by assembling a sufficient number of members 2 to span the walls 10 and 11 of clarifier 12, where device 1 is supported by any suitable means, such as ledge 13 and beams 14.

When the distance between walls 10 and 11 is so great that device 1 would be too long to easily handle or transport, device 1 may be made by abutting separate rectangular modules 1′ along slanting end surfaces 16. It is significant that there are no blind tubes caused by abutting modules 1′, and hence no loss in liquid treatment capacity. Also, the use of smaller abutting modules 1′ facilitates repair or replacement of damaged tubes.

As shown in FIGS. 1 and 2, the longitudinal axes of rectangular modules 1′ are aligned so that the side edges define essentially straight lines. When used in circular tanks, it is advantageous to have such axes intersect, and hence the modules 1′ are not aligned longitudinally. Even though not aligned longitudinally, the slanting end surfaces 16 will still overlap, and this increases the effective liquid treatment area. Thus, an additional advantage of this invention is that the loss of effective treatment area at the corners of modules 1′ is minimized without having to miter such corners.

Members 2 may be made from any suitable, extrudable material, such as polyvinylchloride, polyproplene, A.B.S., or other synthetic plastics. Members 2 also may be made from metals such as aluminum or stainless steel. The preferred material is A.B.S. plastic with ultraviolet light inhibitor, in which case members 2 may be from 10–30 mils in thickness with 25–30 mils being the preferred size; enlarged portion 7 should be about twice as thick as the rest of members 2 (e.g. 50–60 mils), as should rib 6'. Ribs 6 are secured in slot means 3 by any suitable arrangement such as welding, solvent welding, or bonding with any suitable adhesive. Thus, settling device 1 defines a bundle of identical, parallel, rectangular tubular channels 15, through which liquid and solids travel in an upward direction. The solids are separated in the well-known manner and clarified liquid exits through any suitable means such as weir 25. In one embodiment, each channel 15 was approximately two inches square, 24 inches long, and inclined at an angle of 60° to the horizontal. That liquid-solid separation device was used effectively in water treatment clarifiers having a flow rate of three gallons per minute per foot of projected horizontal area. Superior performance resulted from the relatively uncluttered, smooth, straight surfaces of channels 15, when compared with similar prior art settlers. Also, because the exterior of device 1 does not have any projections, and because there are no blind tubes, a larger number of channels may be defined in any given clarifier.

Figure 7:
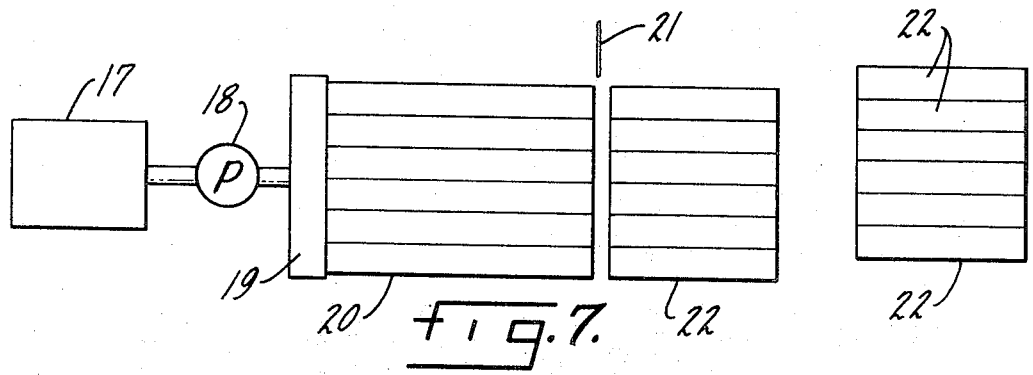
FIG. 7 is a schematic representation of a method of making liquid treatment equipment according to the teachings of this invention.

FIG. 7 shows in schematic fashion a preferred method of constructing a settling device in accord with this invention. Plastic material such as A.B.S. is melted by a heater 17 and forced by a pump 18 through a suitably shaped extruding die 19. A continuous, endless, extrusion 20 having the configuration of member 2 emerges from die 19. Extrusion 20 is cooled and straightened by conventional means and after it is sufficiently stiff to be handled, cutter means 20 severs segments 22 which are then stacked and secured together. The length of segments 22 should be predetermined to provide the vertical settling depth d of the tubes of device 1 as shown in FIG. 1.

Figure 8:
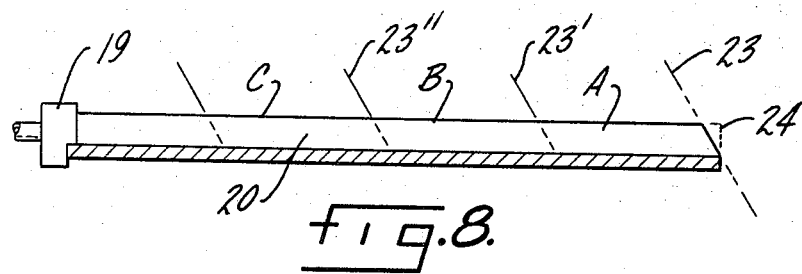
FIG. 8 is a schematic representation of how an extrusion is cut into segments according to the teachings of this invention.

FIG. 8 shows how segments 22 are cut so as to essentially eliminate scrap, and FIG. 1 shows how segments 22 are arranged in device 1 so that waste is minimized and blind tubes eliminated. As continuous extrusion 20 emerges from die 19, the first cut by means 21 occurs along dotted line 23 and the corner 24 is removed. Corner 24 is theoretically the only scrap which need be produced in the construction of device 1. The second cut is made along line 23' so as to completely sever segment A from continuous extrusion 20. Subsequent cuts are made along lines 23'' and the like, which will sever successive segments B and C from extrusion 20. The angle of the cuts 23 is the same to the angle made by the channels 15 in device 1 (e.g. 60°).

In FIG. 1, members 2 may be a plurality of segments 22, including segments A, B, and C from FIG. 8. Note that the area where the corner 24 from FIG. 8 would appear is indicated in phantom in FIG. 1, and this represents the only scrap which necessarily occurs in the construction of device 1. In the areas designated 26 and 27, prior art multi-tubed liquid treating devices would have blind tubes that would represent excessive scrap. In other words, the tubes in the areas of 26 and 27 would have an end blocked by either of walls 10 or 11 and therefore would be useless so far as clarifying liquid is concerned. This would greatly increase the cost of the equipment.

The endmost member 2' for device 1, as shown in FIG. 1, may be made by removing projections 6 from a member 2. It is also possible for the endmost member 2' to be a specially extruded closure member 28 as shown in FIG. 9. Special end closure member 28 does not have ribs 6, but does have integral slot means 3 on one surface thereof, and thus is identical to members 2 except for the absence of ribs.

Returning to the remaining figures, additional embodiments of the invention are disclosed. Unless specifically stated otherwise, in each of the various embodiments of FIGS. 10–17, members corresponding to members 2 are identical, extruded, plastic components of a liquid-solid separation device used in the same manner as device 1 in FIGS. 1 and 2, and such embodiments are fabricated, assembled, and the members bonded as described with reference to FIGS. 1–9.

FIG. 10 shows an embodiment in which the integral material 29 which defines slot means 3 extends only perpendicularly beyond a first surface 30 of member 2. Ribs 6 extend beyond the second or opposite surface 31 of member 2 immediately above slot means 3, and are received and bonded in slot means 3.

FIG. 11 shows another embodiment in which the slot means 3 are substantially T-shaped, and are dimensioned to receive correspondingly shaped projections 38 in the form of perpendicular cross members at the end of ribs 6. Members 2 with T-shaped slots 3 and projections 38 may be secured to each other without the use of a bonding agent because of the friction fit.

FIG. 12 shows an embodiment similar to that of FIG. 11 except that slot means 3 are arrow-head shaped and the projections 41 on the ends of ribs 6 are also arrow-head shaped.

FIG. 13 shows another embodiment in which the slot means 3 are defined by integral material located at the ends of short ribs 42 which extend from a first surface 43 of members 2. When compared with FIG. 3, ribs 42 may be half the depth of ribs 6. Ribs 44 extend from the opposite surface 45 of members 2 and are dimensioned to make up the remaining depth needed to equal that of ribs 6.

FIG. 14 shows another embodiment in which members 2 each comprise flat intersecting segments 50 which meet at included angles 51. Slot means 3 for receiving integral ribs 6 are defined by the vertices of angles 51. Enlarged portions 52 on the ends of ribs 6 may be arrow-head shaped with the point of the arrow having the same angle 51 as the segments 50.

FIG. 15 shows another embodiment in which members 2 each comprise a series of identical curved segments 54 which intersect at cusps 55. Slot means 3 for integral ribs 6 are defined by cusps 55.

FIGS. 16 and 17 show emodiments in which there are no slot means 3 on members 2 for receiving ribs 6. Instead, in FIG. 16, the means for securing ribs 6 to the adjacent member 2 are enlarged flat extensions 60 at the terminal end of each rib. Extensions 60 should be several times longer than the thickness of ribs 6 (e.g. 60 mils for the 30 mil rib 6 of FIGS. 1–3) so that the ribs can be bonded to the flat, unobstructed surface 61 on the opposite side of the adjacent member 2. In FIG. 16, the extensions 60 define substantially T-shaped elements, whereas in FIG. 17, the extensions 63 define L-shaped elements.

It has thus been shown that by the practice of this invention, a liquid treatment device comprising parallel tubes can be constructed from identical, extrudable members having means for securely fastening such members together. Waste is substantially eliminated, and the inner surface of the tubes along which solid particles settle are substantially unobstructed so as to provide minimum interference with the downward flow of the solid particles.

While the present invention has been described with reference to particular embodiments, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. Apparatus for separating solids from liquids including means defining a plurality of parallel tubes comprising:
   a. a member having a series of spaced-apart slot means defined on a first surface thereof;
   b. generally flat ribs extending from the opposite surface of said member, each such rib having an edge dimensioned to fit into said slot means;
   c. at least two of said members being aligned parallel to each other with the respective slot means on each such member being aligned with corresponding slot means on the other member; and
   d. at least three of said ribs each being received in and secured to the slot means of one of said members so as to define with said two members at least two adjacent tubes for receiving a mixture of liquids and solids.

2. The invention defined in claim 1 wherein said slot means are defined by integral material of each member extending generally parallel to the plane thereof.

3. The invention defined in claim 2 wherein said ribs are secured to and extend from said integral material.

4. The invention defined in claim 2 wherein said ribs are integral with said members and extend therefrom on the surface opposite to said integral material.

5. The invention defined in claim 2 wherein said slot means are T-shaped and said edge of said ribs is T-shaped for fitting thereinto.

6. The invention defined in claim 2 wherein said slot means are arrowhead-shaped and said edge of said ribs is arrowhead-shaped for fitting thereinto.

7. The invention defined in claim 1 wherein said slot means each are defined by two integral material projections extending perpendicular to the surface of said member.

8. The invention defined in claim 1 wherein said members are planar.

9. The invention defined in claim 1 wherein said members are curved.

10. The invention defined in claim 9 wherein said members each comprise a series of identical curved segments intersecting at cusps which define slot means.

11. The invention defined in claim 1 wherein said members comprise flat intersecting segments which meet at angles, the vertices of which define said slot means.

12. The invention defined in claim 1 in which said slot means is defined by integral material located at the end of short ribs extending from said first surface.

13. The invention defined in claim 1 wherein said ribs are thicker than the remainder of said member.

14. The invention defined in claim 11 wherein the endmost ribs on each member are offset toward the center thereof.

* * * * *